United States Patent [19]

Tietje

[11] 4,018,305
[45] Apr. 19, 1977

[54] LUBRICANT METERING ASSEMBLY

[75] Inventor: Helmut G. Tietje, Woodcliff Lake, N.J.

[73] Assignee: Lube Systems Corporation, Saddle Brook, N.J.

[22] Filed: Feb. 24, 1975

[21] Appl. No.: 552,725

Related U.S. Application Data

[63] Continuation of Ser. No. 295,819, Oct. 10, 1972, abandoned.

[52] U.S. Cl. .............................................. 184/45 R
[51] Int. Cl.² ........................................ F16N 11/04
[58] Field of Search ..................... 184/45 R, 45 A; 277/236; 222/386; 285/31; 138/30

[56] References Cited

UNITED STATES PATENTS

| | | | |
|---|---|---|---|
| 509,668 | 11/1893 | Liebing | 184/45 R |
| 1,141,720 | 6/1915 | Mastin | 184/45 R |
| 1,479,641 | 1/1924 | Battle | 184/45 R |
| 1,675,189 | 6/1928 | MacIndoe | 184/45 R |
| 2,371,633 | 3/1945 | Lippincott | 138/30 |
| 2,593,972 | 4/1952 | Bray | 184/45 R |
| 3,301,578 | 1/1967 | Platt et al. | 285/331 |
| 3,498,413 | 3/1970 | Krieger | 184/45 R |
| 3,739,877 | 6/1973 | Oliveri | 184/45 R |

Primary Examiner—Richard C. Pinkham
Assistant Examiner—Arnold W. Kramer
Attorney, Agent, or Firm—Marn & Jangarathis

[57] ABSTRACT

A lubricant metering assembly is disclosed comprised of a lubricant cup positioned within a housing and having a spring-loaded piston assembly including a stem which is caused to move within a cylindrically-shaped passageway including a stem guide formed in a housing. At least one channel of variable cross-sectional area is formed in the stem in a manner to result in an increase in the cross-sectional area of a supply passageway formed by the channel with the stem guide in precise relationship to a decrease in the compressional force of the spring.

3 Claims, 5 Drawing Figures

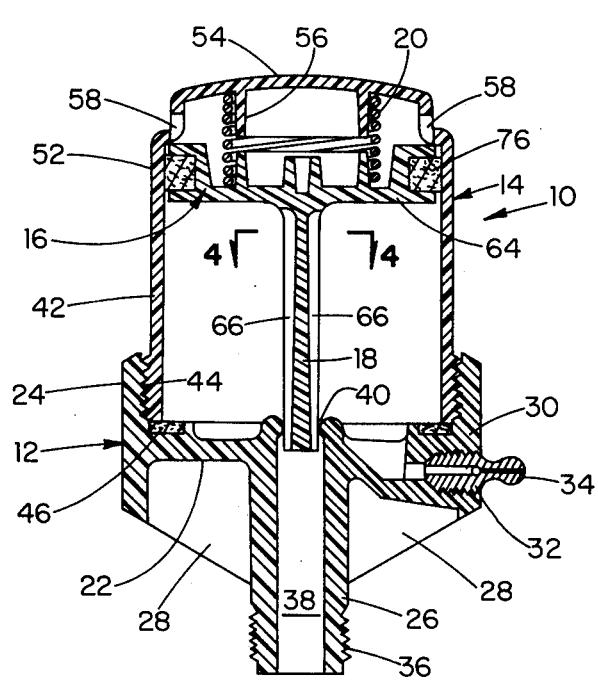
Fig. 1
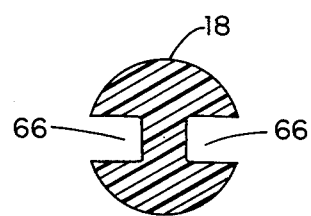
Fig. 4
Fig. 5
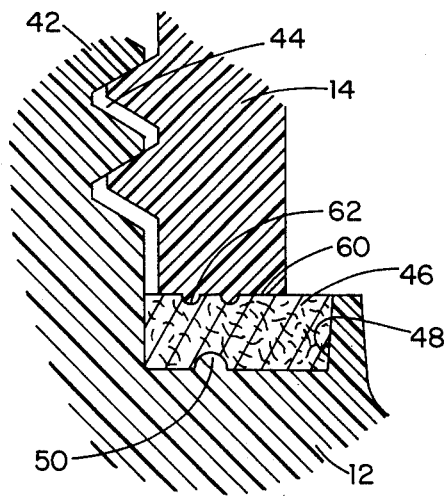
Fig. 3
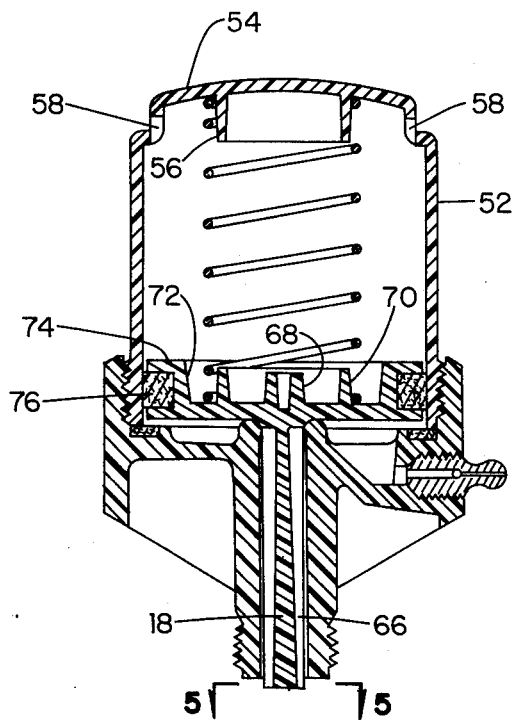
Fig. 2

LUBRICANT METERING ASSEMBLY

This is a continuation of application Ser. No. 295,819, filed Oct. 10, 1972 and now abandoned.

BACKGROUND OF THE INVENTION

This invention relates to lubricant metering assemblies, and more particularly, to a lubricant metering assembly for the continuous supply at a constant rate of flow of a lubricant to a bearing assembly or the like, of a machine or equipment requiring lubrication.

In U.S. Pat. No. 3,498,413 to Krieger, there is disclosed a grease cup assembly comprised of a cup formed of a transparent material positioned within a housing attached to a machine assembly requiring lubrication. A piston and a spring are disposed within the cup to force a lubricant to the machine assembly. A headed valve stem is affixed to the piston and is caused to move within an outwardly tapered flow channel formed within the housing between supply orifices therein and the machine assembly. When the cup is filled to capacity, the tapered head portion seals the orifices and locks the supply orifices in an inoperative position since the piston is unable to move downwardly without effecting the flow of grease therein which is prevented by the closure of the supply orifices by the headed portion of the valve stem. Additionally, fluid control is only initially effected when the combined cross-sectional area of the supply orifices is greater than the cross-sectional area about the annular orifice formed by the configuration of the taper channel with regard to the circumference of the headed portion of the valve stem (on a plane perpendicular to the axis of the stem). Once the headed portion of the valve stem reaches a point where the cross-sectional area of such annular orifice is greater than the combined cross-sectional area of the supply orifices, the flow of lubricant is limited by the restriction of the supply orifices, and since the cross-sectional area of the supply orifices is fixed, there is no compensation for decreasing compressional force of the spring. Additionally, a significant amount of the lubricant capacity of the grease cup assembly is disposed in an annular cavity within the housing and is not expelled by the spring loaded piston. The static segments of the grease volume tends to cake and solidify as the oil content decreases as a result of oil and filler separation thereby resulting in eventual malfunctioning thereof unless the grease cup is periodically disassembled and the caked portion manually removed. Such manual handling requires equipment shut-down as well as presents undesired material handling problems. Further, in order to permit the disassembly of the grease cup for cleaning procedures, it is necessary to remove the grease cup from the associated equipment.

OBJECTS OF THE INVENTION

An object of the present invention is to provide an improved lubricant metering assembly.

Another object of the present invention is to provide an improved lubricant metering assembly which more accurately compensates for changing spring forces to provide a proper flow of lubricant to the equipment requiring lubrication.

Still another object of the present invention is to provide an improved lubricant metering assembly whereby the dispensable lubricant volume is a substantial portion of the lubricant capacity thereof.

A further object of the present invention is to provide an improved lubricant metering assembly which eliminates pockets or crevices thereby substantially reducing cake build-up and subsequent malfunctioning.

A still further object of the present invention is to provide an improved lubricant metering assembly which may be disassembled without the necessity of removing the assembly from associated equipment.

SUMMARY OF THE INVENTION

These and other objects of this invention are achieved by providing a lubricant metering assembly comprised of a lubricant cup positioned within a housing and having a spring-loaded piston assembly including a stem which is caused to move within a cylindrically-shaped passageway including a stem guide formed in a housing. At least one channel of variable cross-sectional area is formed in the stem in a manner to result in an increase in the cross-sectional area of a supply passageway formed by the channel with the stem guide in precise relationship to a decrease in the compressional force of the spring.

BRIEF DESCRIPTION OF THE DRAWINGS

Further objects and advantages of the invention will become apparent upon consideration of the detailed disclosure thereof, especially when taken with the accompanying drawings, wherein like numerals designate like parts throughout, and wherein:

FIG. 1 is a sectional front elevational view of the lubricant cup assembly of the present invention in a lubricant filled mode.

FIG. 2 is a sectional front elevational view of the lubricant cup assembly of the present invention in a lubricant dispensed mode.

FIG. 3 is an enlarged view of the sealing configuration of the lubricant cup with the housing therefor.

FIG. 4 is a cross-sectional view of the piston stem taken along the lines 4—4 of FIG. 1; and FIG. 5 is a bottom view of the piston stem taken along the lines 5—5 of FIG. 2.

DETAILED DESCRIPTION OF THE INVENTION

Referring to the drawings and particularly FIGS. 1 and 2, there is illustrated a lubricant metering assembly, generally indicated as 10, comprised of a housing 12, a cylindrically shaped cup 14, a piston assembly 16 including a step 18, and a coil spring 20. The housing 12 is comprised of a disc shaped base section 22 with a cylindrically shaped outer wall 24 formed about the terminal portion of the base section 22 and a cylindrically shaped inner wall section 26 formed at an interior portion of the base section 22. The section wall 26 is in concentric alignment with the outer wall 24 and extends from said base section 22 on the side thereof opposite a lubricant reservoir L thereof as more clearly hereinafter described. A plurality of vanes 28 are radially disposed between the outer wall 24 and the inner wall section 26. A portion of the base section 22 and the outer wall 24 is formed with a lubricant resupply section 30 including an orifice 32 in which is threaded a conventional type lubricant fitting 34.

The exterior lower surface of the inner wall section 26 is provided with an externally threaded section 36 to permit mounting of the assembly 10 to a machine (not shown) to be lubricated. The inner wall section 26 is formed with an interior cylindrical shaped passageway 38 terminating at an upper end portion thereof with a portion of reduced cross section to provide a stem guide 40 for the stem 18 of the piston 16. It is noted that the passageway 38 flares outwardly from the stem guide 40 to permit continuous lubricant flow while inhibiting secondary flow resistance to the lubricant by the wall defining the passageway 38. The upper interior surface of the outer wall section 24 of the housing 12 is provided with an internally threaded section 42 to receive in threaded engagement the lower externally threaded portion 44 of the cup 14 which is forced against a seal ring 46 positioned within a receiving channel 48 including a sealing rib or ridge 50 formed in the base section 22 of the housing 12 as illustrated in FIG. 3.

The cup 14 is formed of a cylindrical side wall 52 enclosed at one end by a dished-shaped end wall 54 having an inwardly extending cylindrically shaped interior wall 56. The end wall 54 is formed at a position on the side wall 52 to permit the piston assembly 16 to travel therein through a linear distance which is greater than about 35 percent of the overall height of the assembly 10. About the junction of the side wall 52 with the end wall 54, there is provided a plurality of orifices 58 to permit evacuation of air within the upper portion of assembly 10 during lubricant refilling of the assembly 10. An end portion of the side wall 52 of the cup 14 is provided with concentric ribs or ridges 62 in concentric and spacial relationship to the ridge 50 of the housing 12 to compress effectively the seal 46 to prevent leakage of oil from the assembly as a result of the "bridging effect", i.e the separation of oil from the filler materials forming the lubricant. Leakage of oil indicates an increase in viscosity of the lubricant and a potential malfunction if the condition becomes severe.

The piston 16 is comprised of a disc shaped base member 64 disposed in a plane substantially perpendicular to the axis of the housing 12 and is provided with the cylindrical stem 18 thereof extending into and through the stem guide section 40 of the housing 12. The stem is formed with two generally U-shaped channels 66 of increasing cross-sectional area from the terminal portion thereof to a portion about the juncture of the stem 18 with the base 64 (as is readily apparent from FIGS. 1, 4 and 5) to permit a substantially constant flow of lubricant through the lubricant passageways during displacement of the piston 16 within the cup 14 notwithstanding a decrease in the spring compressional force, as more fully hereinafter described. The inner surface of the stem guide serves as a precise bearing wall for the stem 18 as well as define the lubricant passageways with the cylindrical stem 18 acting as a stabilizer for the piston 16 to maintain the piston 16 perpendicular to the direction of travel. It will be appreciated that the shape of the channels 66 may be varied and that the channels should be evenly positioned to avoid the bridging effect. In order to provide proper guide requirements, the gap between the cylindrical surface portions of the stem 18 and the surface of the stem guide 40 should be less than about 0.010 inch, preferably less than 0.005 inch. Since gap requirements are a function of the cross-sectional area of the passageways, compressional force of the spring, lubricant type etc., an assembly is effective provided that the gap is not greater than 20%, preferably less than 10%, of the shortest distance across the passageway section in a lubricant filled mode of the assembly. The base 64 is provided with upwardly extending concentric walls 68, 70 and 72. The outer wall 72 is formed with an outwardly extending portion 74 disposed in paralleled relationship to the base 64 to form therebetween a U-shaped chamber for a receiving sealing gasket 76.

The coil spring 20 is disposed within the assembly 10 with one end portion thereof being positioned about the cylindrical inner wall 56 of the cup 14 with the other end portion thereof being positioned between cylindrical inner walls 70 and 72 of the base member 64 of the piston 16. The spring 20 provides the means for effecting lubricant flow from the lubricant reservoir L to the lubricant supply orifice 38 via the passageways of variable cross-sectional area formed by the channels 66 of the stem 18 at any position thereof with the stem guide 40 of the housing 12. It is as a result of the changing cross-sectional area of the passageways at the point about the stem guide 40 which permits substantially constant lubricant flow to and through the supply orifice 38 notwithstanding a decreasing spring compressional force during movement of the piston 16 from a filled mode to an empty mode of the assembly 10. The change (increase) in the cross-sectional area of the passageways should be directly proportional to the change (decrease) in the compressional force of the spring 20 throughout the travel of the piston 16 within the cup 14. For example, if the compressional force of the spring at the lubricant filled mode is twice that in the empty mode, then the change in cross-sectional area of the passageways from the beginning to the end of the travel distance of the piston 16 should be double. Should the change in spring compressional force be linear, then the change in cross-sectional area of the passageways should be linear. Since the compressional forces are generally non-linear, the cross-sectional area of the passageway should follow a non-linear character with the channel depth and width changing to yield a cross-sectional area that maintains a constant ratio with respect to the compressional force of the spring throughout the travel distance of the piston.

The assembly 10 of the present invention accommodates a cylindrical coil spring 20 with minimum amount of vertical space devoted to spring height and with sufficient over-travel capacity to provide a relatively flat force curve over the travel distance. Additionally, such a spring may be completely compressed, i.e. one coil on top of another, without exceeding the elastic limit of the coil wire, which also lends itself to maximum condensation of the vertical distance within the unit.

In operation, a high pressure lubricant injector or gun (not shown) is suitably positioned on the fitting 34 and lubricant introduced via the orifices 32 into the lubricant reservoir L formed by the base 22 of the housing 12, the interior surface of the side wall 52 of the cup 14 and the lower surface of the base 64 of the piston member 16 until the piston member 16 is caused to rest on a portion of the disc shaped end wall 54, as shown in FIG. 1. Generally, the lubricant assembly 10 is affixed to the machine to be lubricated after filling the lubricant reservoir L. Upon removal of the lubricant gun, the compressional force of the spring 20 results in downward movement of the piston 16 including the stem 18 within the cup 14 and housing 12, with lubricant flow resulting in a concomitant proportional increase in the cross-sectional area of the orifice lubricant passages formed by the U-shaped channels 66 of the stem 18 with the stem guide 40 thereby adjusting for a decreasing compressional force of the spring 20, however, providing for a substantially constant flow of lubricant throughout the travel of the piston 16 within the assembly 10. It will be understood that springs of diverse compressional capabilities will be used depending upon the viscosity of the lubricant; i.e. the heavier the lubricant, the greater the compressional requirements of the spring.

Numerous modifications and variations of the invention are possible in light of the above teachings and therefore the invention may be practiced otherwise than as particularly described.

What is claimed is:

1. A lubricant metering assembly for supplying a substantially constant flow of lubricant to an apparatus to be lubricated which comprises:

a housing including a base member, an outer wall element about said base member and an inner wall member extending downwardly from said base member, said base member being provided with a substantially flat top wall and including thread means, said inner wall member having a lubricant supply passageway formed therethrough with an upper portion thereof of reduced cross-sectional area thereby forming a guide means, said top wall of said base member of said housing being provided with an upwardly extending cylindrically shaped section forming a channel with said outer wall to receive a sealing ring; said top wall being provided with a concentric rib within said channel;

a cylindrical lubricant container comprised of an end wall and side wall positioned within and mounted to said housing, said container having at least one orifice about said end wall, said end wall being provided with a downwardly extending positioning means, said side wall being provided with thread means and a downwardly extending rib formed on lower terminal portion thereof;

a sealing ring compressively disposed in said channel of said base member between said base member and terminal portion of said end wall of said container;

a piston including a downwardly extending stem, said piston being provided with peripheral seal means for contacting the interior surface of the side wall of said container and an upwardly extending positioning means, said stem being cylindrically-shaped and in contacting relationship with said guide means with a spacing of less than 0.010 inches, said stem being provided with at least one exterior channel of increasing cross-sectional area as measured upwardly from the lower terminal portion of said stem, said piston being formed with a substantially flat bottom wall which cooperates with said flat top wall of said base member thereby minimizing the amount of lubricant remaining in said assembly upon completion of travel of said piston with the travel distance of said piston being greater than 35 percent of the overall height of the assembly; and a coil spring disposed between and about the positioning means of said container means and said positioning means of said piston, said spring having decreasing compressional force compensated by a passageway of increasing cross-sectional area formed by said channel and said guide means to permit substantially constant flow of lubricant.

2. The lubricant metering assembly as defined in claim 1 wherein the cross-sectional area of the passageway proportionally increases with decreasing spring compressional forces.

3. The lubricant metering assembly as defined in claim 1 wherein said spacing is less than 0.005 inches.

* * * * *